US012281578B2

(12) United States Patent
Jarrossay et al.

(10) Patent No.: US 12,281,578 B2
(45) Date of Patent: Apr. 22, 2025

(54) TURBINE SHROUD ASSEMBLY

(71) Applicant: Safran Aircraft Engines, Paris (FR)

(72) Inventors: Clément Jarrossay, Moissy-Cramayel (FR); Sébastien Serge Francis Congratel, Moissy-Cramayel (FR); Antoine Claude Michel Etienne Danis, Moissy-Cramayel (FR); Aurélien Gaillard, Moissy-Cramayel (FR); Nicolas Paul Tableau, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/913,310

(22) PCT Filed: Mar. 22, 2021

(86) PCT No.: PCT/FR2021/050469
§ 371 (c)(1),
(2) Date: Sep. 21, 2022

(87) PCT Pub. No.: WO2021/191538
PCT Pub. Date: Sep. 30, 2021

(65) Prior Publication Data
US 2023/0116425 A1 Apr. 13, 2023

(30) Foreign Application Priority Data
Mar. 24, 2020 (FR) ...................................... 2002849

(51) Int. Cl.
*F01D 11/08* (2006.01)
*F01D 11/24* (2006.01)
*F01D 25/24* (2006.01)

(52) U.S. Cl.
CPC ............ *F01D 11/24* (2013.01); *F01D 25/243* (2013.01); *F05D 2220/32* (2013.01); *F05D 2230/60* (2013.01); *F05D 2240/11* (2013.01)

(58) Field of Classification Search
CPC ...... F01D 25/24; F01D 25/246; F01D 25/243; F01D 11/08; F05D 2240/11; F05D 2230/64
See application file for complete search history.

(56) References Cited

U.S. PATENT DOCUMENTS

2012/0027572 A1* 2/2012 Denece ...................... F01D 9/04
 415/127
2012/0171027 A1 7/2012 Albers et al.
(Continued)

FOREIGN PATENT DOCUMENTS

FR 3 068 072 A1 12/2018
JP 5887130 B2 3/2016
(Continued)

OTHER PUBLICATIONS

International Search Report (PCT/ISA/210), issued in PCT/FR2021/050469, dated Jul. 27, 2021.
(Continued)

*Primary Examiner* — David E Sosnowski
*Assistant Examiner* — Maxime M Adjagbe
(74) *Attorney, Agent, or Firm* — Birch, Stewart, Kolasch & Birch, LLP

(57) ABSTRACT

Turbine shroud assembly comprising sections (10) made from CMC and forming a shroud (1) and a support structure (3), each section having a base (12) with a radially internal face (12*a*) and a radially external face (12*b*), from which there extend in a projecting manner an upstream attachment lug (14) and a downstream attachment lug (16), the support structure comprising a collar (31), from which there radially extend in a projecting manner towards the shroud an upstream radial flange (32) and a downstream radial flange (36), by which the lugs of each section of the shroud are retained, the shroud (1) being retained by axial pins (119, 120) which cooperate, on the one hand, with the upstream radial flange, via first and second annular end plates (33, 34), and directly with the downstream radial flange and, on the other hand, with the upstream and downstream attachment lugs, respectively.

8 Claims, 3 Drawing Sheets

(56) References Cited

U.S. PATENT DOCUMENTS

| | | | |
|---|---|---|---|
| 2018/0051590 A1* | 2/2018 | Tableau | F01D 25/246 |
| 2018/0051591 A1* | 2/2018 | Quennehen | F01D 11/005 |
| 2018/0087401 A1* | 3/2018 | Quennehen | F01D 11/08 |
| 2018/0363506 A1 | 12/2018 | Tesson et al. | |
| 2018/0371948 A1* | 12/2018 | Lepretre | F01D 25/246 |
| 2019/0128132 A1* | 5/2019 | Tableau | F01D 5/284 |
| 2020/0063601 A1 | 2/2020 | Filippi et al. | |

FOREIGN PATENT DOCUMENTS

| | | |
|---|---|---|
| WO | WO 2017/103411 A2 | 6/2017 |
| WO | WO 2017/103411 A3 | 8/2017 |

OTHER PUBLICATIONS

Written Opinion of the International Searching Authority (PCT/ISA/237), issued in PCT/FR2021/050469, dated Jul. 27, 2021.

\* cited by examiner

-- Prior Art --

TURBINE SHROUD ASSEMBLY

FIELD OF THE INVENTION

The present invention relates to a turbine ring assembly comprising, on the one hand, a plurality of ring sectors made of ceramic-matrix composite material and, on the other hand, a structure for supporting this ring.

STATE OF THE ART

The field of application of the invention is in particular that of aeronautical gas turbine engines. The invention is however applicable to other turbomachines, for example industrial turbines.

In the case of all-metal turbine ring assemblies, it is necessary to cool all the elements of the assembly and particularly the turbine ring which is subjected to the hottest streams.

This cooling has a significant impact on the engine performance, since the cooling stream used is taken from the main stream of the engine. Furthermore, the use of metal for the turbine ring limits the possibilities of increasing the temperature at the level of the turbine, which would nevertheless allow improving the performance of aeronautical engines.

In an attempt to solve these problems, it has been envisaged to make turbine ring sectors out of ceramic-matrix composite (CMC) material, in order to dispense with the use of a metal material.

CMC materials have good mechanical properties, which makes them able to constitute structural elements. In addition, they advantageously retain these properties at high temperatures. The use of CMC materials has thus allowed to reduce the cooling stream to be imposed during the operation and therefore to increase the performance of the turbomachines.

Expressed differently, the integration of a ring made of CMC material, whose resistance temperature is high, allows reducing the flow rate of air taken from the chamber bottom, necessary for the pressurization of the cavities outside the flowpaths and, consequently, gaining specific consumption of the engine.

Despite the low density of CMC materials compared to the usual metal materials, the expected mass gain is not obtained, due to the constraints of integration of the ring with the parts with which it cooperates.

Document FR 3076578 typically illustrates such a CMC material ring assembly associated with a metal ring support structure.

The appended FIG. 1 is a schematic sectional view of a turbine ring assembly in accordance with this prior art.

More specifically, the represented high-pressure turbine ring assembly comprises a turbine ring 1 made of ceramic-matrix composite (CMC) material and a metal structure 3 supporting this ring. This ring 1 surrounds a set of rotary blades (which are not represented here). The ring 1 is formed of a plurality of ring sectors 10 (only one is visible in FIG. 1). The arrows DA and DR respectively indicate the axial and radial directions of the turbine ring 1.

As illustrated in FIG. 1, each ring sector 10 has, along a plane defined by the axial DA and radial DR directions, a section substantially in the shape of the inverted Greek letter π (pi). This section comprises an annular base 12 and upstream and downstream radial attachment lugs, respectively 14 and 16. The terms "upstream" and "downstream" are used throughout the present application, in reference to the direction of flow of the gas stream in the turbine, which is represented by the arrow F.

The annular base 12 includes, along the radial direction DR of the ring 1, an inner face 12a and an outer face 12b opposite to each other. The inner face 12a of the annular base 12 is coated with a layer 13 of abradable material to define a gas stream flowpath in the turbine. The terms "inner" and "outer" are used here in reference to the radial direction DR of the turbine.

The ring support 1 structure 3, which is fixed to a turbine casing, comprises a central shroud 31, which extends generally in the axial direction DA. Its axis of revolution coincides with the axis of revolution of the turbine ring 1 when they are fixed together. The structure further comprises a first and a second annular radial clamps 32, respectively 36. The first clamp 32 is positioned upstream of the second clamp 36.

The turbine ring assembly 1 further comprises first and second annular flanges 33 and 34, these two annular flanges being removably fixed on the first annular radial clamp 32. They are disposed upstream of the turbine ring 1 with respect to the direction F of flow of the gas stream in the turbine. The first flange 33 is disposed downstream of the second flange 34.

The first annular flange 33 has a first inner portion 333 and a second outer portion 334.

The second annular flange 34 has a first free end 341 and a second end 342 opposite to the first free end, which is in contact with the central shroud 31. The second end 342 of the second annular flange 34 is also removably fixed to the ring support structure 1, and more particularly to the first annular radial clamp 32.

When the ring assembly 1 is in place, the first portion 333 of the first annular flange 33 is bearing against the upstream radial attachment lug 14 of each of the ring sectors 10 making up the turbine ring 1, and the second portion 334 of the first annular flange 33 is bearing against at least part of the first annular radial clamp 32.

The two flanges 33 and 34 are removably fixed on the upstream annular radial clamp 32 by means of fixing screws 60 and nuts 61, the screws 60 passing through orifices provided respectively in the two flanges as well as in the clamp 32. Again, only one screw and only one nut are visible in FIG. 1.

The second annular flange 34 is intended to take up the force of the high-pressure distributor (HPD) on the ring assembly 1, by transiting this force to the casing line which is mechanically more robust, that is to say to the line of the ring support structure, as represented by the arrow E in FIG. 1. The residual force, which passes through the first upstream flange 33, is reduced since its first portion 333 has a reduced section, and is therefore more flexible, which allows applying a minimum force on the CMC ring 1.

In the axial direction DA, the downstream annular radial clamp 36 of the ring support structure 3 is separated from the first upstream annular flange 33 by a distance corresponding to the spacing of the upstream and downstream radial attachment lugs 14 and 16 so as to hold them between the downstream annular radial clamp 36 and the first upstream flange 33.

In order to hold the ring sectors 10, and therefore the turbine ring 1, in position with the ring support structure 3, the ring assembly comprises, for each ring sector 10, first pins 119 cooperating with the upstream attachment lug 14 and the first annular flange 33, and second pins 120 cooperating with the downstream attachment lug 16 and the second annular radial clamp 36. Of course, orifices (not visible) for receiving these pins are provided for this purpose.

The ring support structure 3 further comprises radial pins 38 which allow holding the ring in the low radial position that is to say towards the flowpath, in a deterministic manner. There is indeed a clearance between the axial pins 119 and 120 and the bores on the ring 1 to compensate for the differential expansion between the metal and the CMC elements which takes place under heat. The radial pins 38 cooperate with orifices 380 made along the radial direction DR in the central shroud 31 of the ring support structure 3.

Document 2017/103411 describes a turbine ring assembly in accordance with the preamble of the appended claim 1.

According to this prior art, relative to said direction of flow of a gas stream in said turbine:
the shroud includes a first upstream portion which extends radially above the first attachment lug and a second downstream portion which extends in the extension of the first upstream portion and radially above the second attachment lug, the first upstream portion having the shape of a right cylinder and the second downstream portion having a frustoconical shape which, from one end of the first upstream portion, extends towards the axis of the turbine ring while having a generally constant thickness;
the upstream radial clamp extends from the upstream portion to bear against the upstream attachment lug, while the downstream radial clamp extends from the downstream portion to come into contact against the downstream attachment lug.

Thanks to these characteristics, part of the material of the shroud is transferred to a reduced radius. Its volume and its mass are thus reduced, while obtaining an axisymmetric part. In addition, this structure also allows reducing the flexibility of the casing and therefore the displacements of the assembly, due to the presence of this convergent region in part of the casing.

Furthermore, the use of screws and pins to hold the ring is limited, which reduces the mass of the assembly.

Given this context, the present invention aims to further improve such a turbine ring assembly, particularly in terms of its mass.

PRESENTATION OF THE INVENTION

To this end, the invention relates in particular to a turbine ring assembly comprising a plurality of ring sectors made of ceramic-matrix composite material forming a turbine ring and a ring support structure, each ring sector having, along a cutting plane defined by an axial direction and a radial direction of the turbine ring, said axial direction corresponding to the direction of flow of a gas stream in said turbine, a base with, in the radial direction of the turbine ring, a radially inner face defining the inner face of the turbine ring and a radially outer face from which an upstream attachment lug and a downstream attachment lug protrude, said ring support structure including a shroud which extends around the turbine ring, from which an upstream radial clamp and a downstream radial clamp by which the upstream and downstream attachment lugs of each ring sector are held radially protrude towards the turbine ring, said shroud including, relative to said direction of flow of a gas stream in said turbine, a first upstream portion which extends radially above the first attachment lug and a second downstream portion which extends in the extension of the first upstream portion and radially above the second attachment lug, said first upstream portion having the shape of a right cylinder and the second downstream portion having a frustoconical shape which, from one end of the first upstream portion, extends towards the axis of the turbine ring while having a generally constant thickness, said upstream radial clamp extending from said upstream portion to bear, directly or indirectly, against the upstream attachment lug, while the downstream radial clamp extends from the downstream portion to come into contact against the downstream attachment lug.

According to the invention, the ring is held, relative to said radial clamps, by axial pins which cooperate respectively on the one hand with the upstream radial clamp, via first and second annular flanges and directly with the downstream radial clamp, and on the other hand, with the upstream and downstream attachment lugs.

Thanks to these characteristics, the ring is wedged radially, so that it is no longer necessary to use, as in the prior art described above, radial pins ensuring a deterministic blocking. Being able not to use such pins contributes to reducing the mass of the assembly. Furthermore, according to the prior art described above, the significant thickness of the casing was justified in particular by the fact that it was necessary to guarantee a sufficient guide length for the pins. As these are now no longer necessary, said thickness can be revised downwards and can in particular reach half the thickness according to the prior art.

According to particular embodiments of the invention:
said shroud has a generally constant thickness between said two clamps;
the upstream and downstream portions form an angle comprised between 3° and 80°, preferably between 3° and 70°.
said ring is further compressively held between said radial clamps.

According to some additional characteristics of the invention:
said first and second annular flanges generally have the same thickness considered in the axial direction, along their radial extent;
said ring is at least partly formed of a three-dimensional weaving of ceramic fibers comprising warp yarns and weft yarns, characterized in that the warp yarns/weft yarns ratio is variable within said ring;
said ratio is lower within said annular base than within said attachment lugs.

Finally, the present invention also relates to a turbomachine comprising a turbine ring assembly in accordance with any one of the characteristics detailed above.

DESCRIPTION OF THE FIGURES

Other characteristics and advantages of the invention will appear from the description which will now be made, with reference to the appended drawings, which represent, by way of indication but not limitation, possible embodiments.

IN THESE DRAWINGS

Figure 1:
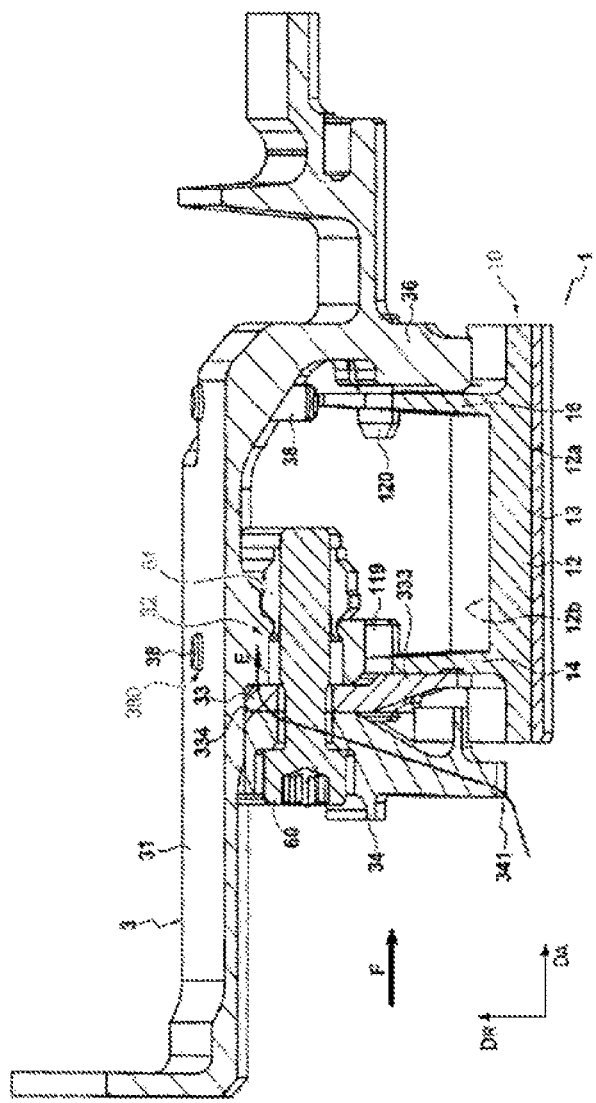
Figure 2:
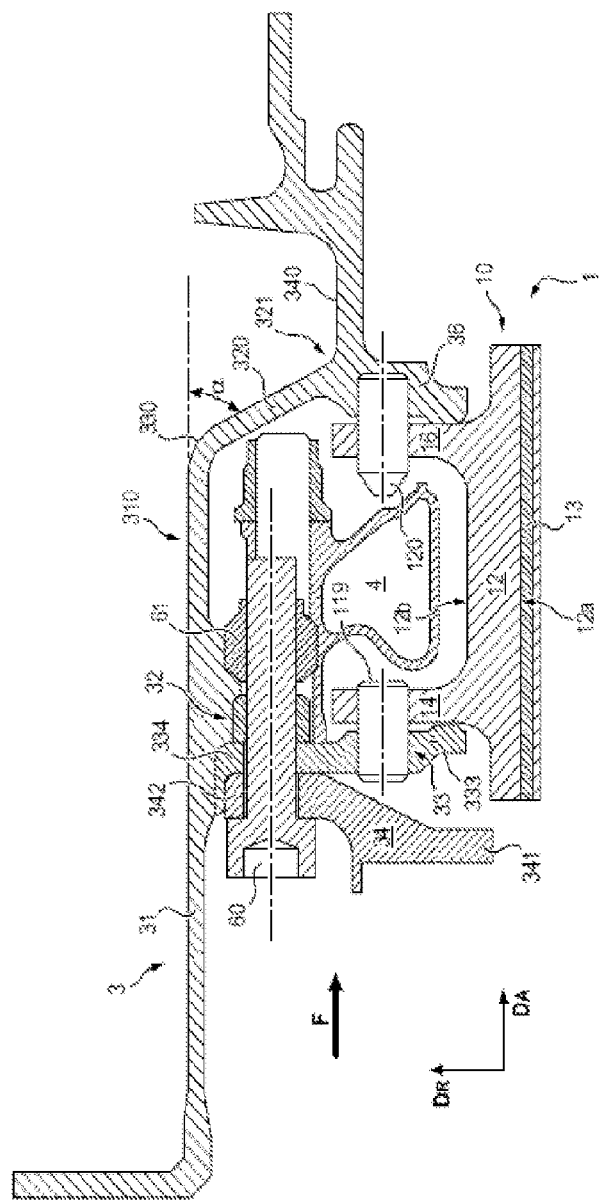
Figure 3:
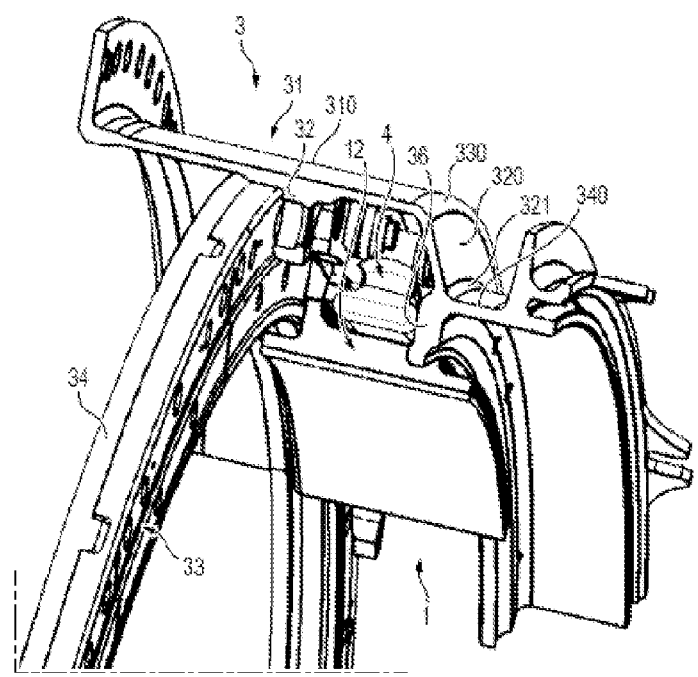

FIG. 1 is, as indicated above, a schematic sectional view of a turbine ring assembly in accordance with the aforementioned prior art;
FIG. 2 is a view similar to FIG. 1 of an assembly in accordance with the present invention;
FIG. 3 is a three-dimensional sectional view of the assembly of FIG. 2.

DETAILED DESCRIPTION OF THE INVENTION

The turbine ring assembly represented in the appended FIGS. 2 and 3 of one exemplary embodiment of the invention is structurally similar with the assembly in accordance with the prior art which has been described above with reference to FIG. 1.

In the following description, the reference numerals identical to those already used with reference to FIG. 1 correspond to identical or similar parts. Under these conditions and unless specified otherwise, the only specific elements of the invention will essentially be described below.

In the same way as according to the aforementioned prior art, the assembly according to the invention includes a ring support 1 structure 3 which comprises a central shroud 31 from which a first and a second clamp 32 and 36 radially protrude by which the first and second attachment lugs 14 and 16 of each ring sector 10 made of ceramic-matrix composite material are held.

According to the invention, this shroud has the particularity of including a first upstream portion 310 and a second downstream portion 320, which are coaxial, this first upstream portion 310 having the shape of a right cylinder, while the second downstream portion has a convergent wall. The transition area 330 of these two portions 310 and 320 is advantageously curved, that is to say devoid of any salient angle.

Advantageously and as shown in FIGS. 2 and 3, this second downstream portion has the shape of a truncated cone.

Still according to the invention, the first radial clamp 32 is fixed to the first upstream portion 310, while the second radial clamp 36 is fixed to the downstream region of the second downstream portion 320. Expressed otherwise, it extends in the region of the portion 320 farthest from the upstream portion 310.

In the case illustrated here, this second clamp extends to the border of the second portion 320 which continues with a downstream extension 340, coaxial with the first portion 310.

Thanks to this structure, a transfer of the material of the casing is made possible, at least partially, towards a smaller radius, which allows substantially reducing the volume of this casing and therefore its mass. In addition, an axisymmetric part is thus obtained, which makes its manufacture easier.

Furthermore, this modification also allows reducing the flexibility and therefore the displacements of the turbine ring assembly, due to the particular conicity of the casing in the second downstream portion.

Advantageously, the angle α formed by the generatrices of the upstream 310 and downstream 320 portions is comprised between 3° and 80° and preferably between 3° and 70°, which allows obtaining a good compromise between stiffness and reduction of the total mass.

In order to further reduce the overall mass of the assembly of the invention, either of the solutions which will be described below can be used.

Thus, it is possible to use a flange 34 disposed upstream of the structure of FIGS. 2 and 3, the thickness of which is thinned to gain mass. This part allows diverting the axial forces which come from the high-pressure diffuser towards the outer casing in order to relieve the ring 1. Thinning such a flange could have stressed the ring 1. However, such an optimization of its geometry allows increasing its flexibility and therefore reducing the forces transmitted axially. Consequently, in addition to the weight gain, the ring 1 is not more stressed than according to the mounting of the prior art described above.

According to the invention, the thickness of the flange 34 is such that the two flanges 33 and 34 generally have the same thickness considered in the axial direction, along their radial extent. Thus, depending on the case, the thickness of the flange 34 can be reduced by half compared to what is practiced according to the prior art.

As in the state of the art, the ring 1 is held axially, relative to the axial clamps 32 and 36, by axial pins 119 and 120 which cooperate on the one hand respectively with the first radial clamp 32, via the first and second annular flanges 33 and 34, and directly with the second radial clamp 36 and, on the other hand, with the first and second attachment lugs 14 and 16.

In the radial direction, the ring 1 is compressively held between the radial clamps 32 and 36 due to the flexibility provided by the reduction of the flange 34 thickness and the frustoconical shape of the second portion 320 of the central shroud 31. Thus, this allows hooping of the attachment lugs 14 and 16 of each ring sector 10, so that the latter is held radially. Therefore, the radial pins represented under the reference 38 in the aforementioned FIG. 1 are no longer necessary. Consequently, the overall mass of the assembly according to the invention is further reduced.

In a known manner, the ring 1 can be obtained at least partly by three-dimensional weaving of ceramic fibers, this weaving comprising warp yarns and weft yarns, as described in particular in document FR 2942844. Still with the aim of reducing the mass of the assembly according to the invention, such a weaving can be carried out by making the warp yarns/weft yarns ratio variable for the manufacture of this ring. More particularly, it is possible to use a lower ratio within the annular base 12, relative to the attachment lugs 14 and 16.

In this way, the thickness of the weaving is reduced in the central portion consisting of the annular base 12, while the thickness of the attachment lugs 14 and 16 is retained. Consequently, and for the same number of weaving layers, a thinner and therefore lighter central portion is thus obtained, but with lugs that are still just as thick and solid.

As indication only, the thickness reduction can be on the order of 0.5 to 5 mm.

Although this does not form part of a particular characteristic of the invention, it will be noted that the assembly represented in the appended FIGS. 2 and 3 includes a cooling device referenced 4.

More specifically, the outer face 12b and the attachment lugs 14 and 16 of the ring 1 form a cavity outside the flowpath, in other words a cavity external to the hot fluid flowpath F.

Due to the presence of high-temperature air on the flowpath side, the wall 12 is subjected to significant thermal gradients. Furthermore, the high pressures existing in the hot air flowpath increase the risk of hot air leakage, in particular at the level of the junctions between the ring sectors 10. The injection of cooling air into the cavity outside the flowpath thus allows cooling the wall 12 of the ring and reducing the thermal gradients therein, and also increasing the pressure in the cavity outside the flowpath, thus limiting the risks of hot air leakage flowing from the flowpath.

The aforementioned cooling device is attached to the flanges 33 and 34, and includes a head directed in the vicinity of the wall 12 of the ring, this head being provided with openings, not represented, to form cooling channels.

The invention claimed is:

1. A turbine ring assembly comprising a plurality of ring sectors made of ceramic-matrix composite material forming a turbine ring and a ring support structure, each of said ring sector having, along a cutting plane defined by an axial direction and a radial direction of said turbine ring, said axial direction corresponding to the direction of flow of a gas stream in said turbine ring assembly, a base with, in said radial direction of said turbine ring, a radially inner face defining the inner face of said turbine ring and a radially outer face from which a first upstream attachment lug and a second downstream attachment lug protrude, said ring support structure including a shroud which extends around said turbine ring, from which an upstream radial clamp and a downstream radial clamp by which said first upstream and second downstream attachment lugs of each ring sector are held protrude radially towards the turbine ring, said shroud including, relative to said direction of flow of a gas stream in said turbine ring assembly:
   a first upstream portion which extends radially above said first upstream attachment lug and a second downstream portion which extends in the extension of said first upstream portion and radially above said second downstream attachment lug, said first upstream portion having the shape of a right cylinder and said second downstream portion being frustoconical and, from one end of said first upstream portion, extending towards an axis of the turbine ring while having a generally constant thickness, wherein said first upstream portion and said second downstream portion form an angle comprised between 30° and 80°;
   said upstream radial clamp extending from said upstream portion to bear, directly or indirectly, against said first upstream attachment lug, while said downstream radial clamp extends from said downstream portion to come into contact against said second downstream attachment lug, wherein said downstream radial clamp extends in a region of the second downstream portion farthest from the first upstream portion, wherein said turbine ring is held, relative to said upstream and downstream radial clamps, by axial pins which cooperate respectively on the one hand with said upstream radial clamp, via first and second annular flanges and directly with said downstream radial clamp, and on the other hand, with said first upstream and second downstream attachment lugs.

2. The turbine ring assembly according to claim 1, wherein said shroud has a generally constant thickness between said upstream and downstream radial clamps.

3. The turbine ring assembly according to claim 1, wherein said ring is further compressively held between said upstream and downstream radial clamps.

4. The turbine ring assembly according to claim 1, wherein said first and second annular flanges generally have the same thickness considered in the axial direction, along their radial extent.

5. The turbine ring assembly according to claim 1, wherein said turbine ring is at least partly formed of a three-dimensional weaving of ceramic fibers comprising warp yarns and weft yarns, wherein a warp yarns/weft yarns ratio is variable within said ring.

6. The turbine ring assembly according to claim 5, wherein said ratio is lower within said base than within said first upstream and second downstream attachment lugs.

7. A turbomachine comprising the turbine ring assembly according to claim 1.

8. The turbine ring assembly according to claim 1, wherein said first upstream portion and said second downstream portion form an angle comprised between 3° and 70°.

* * * * *